(12) United States Patent
Baehrle-Miller et al.

(10) Patent No.: US 11,148,652 B2
(45) Date of Patent: Oct. 19, 2021

(54) METHOD FOR PROVIDING A BRAKE FORCE IN A VEHICLE

(71) Applicant: Robert Bosch GmbH, Stuttgart (DE)

(72) Inventors: Frank Baehrle-Miller, Schoenaich (DE); Edith Mannherz, Weinsberg (DE); Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 15/558,292

(22) PCT Filed: May 20, 2016

(86) PCT No.: PCT/EP2016/061451
§ 371 (c)(1),
(2) Date: Sep. 14, 2017

(87) PCT Pub. No.: WO2016/188910
PCT Pub. Date: Dec. 1, 2016

(65) Prior Publication Data
US 2018/0056951 A1 Mar. 1, 2018

(30) Foreign Application Priority Data

| May 22, 2015 | (DE) | 10 2015 209 480.4 |
| Apr. 11, 2016 | (DE) | 10 2016 205 985.8 |
| May 9, 2016 | (DE) | 10 2016 208 605.7 |

(51) Int. Cl.
*B60T 13/74* (2006.01)
*B60T 7/12* (2006.01)
(Continued)

(52) U.S. Cl.
CPC ........... *B60T 13/746* (2013.01); *B60T 7/107* (2013.01); *B60T 7/12* (2013.01); *B60T 13/145* (2013.01);
(Continued)

(58) Field of Classification Search
CPC ....................................... B60T 7/12
See application file for complete search history.

(56) References Cited

U.S. PATENT DOCUMENTS

2005/0206231 A1* 9/2005 Lu ................. B60G 17/0162
303/146
2014/0069750 A1* 3/2014 Nohira ............... B60T 13/741
188/71.8
(Continued)

FOREIGN PATENT DOCUMENTS

| DE | 197 36 997 A1 | 3/1999 |
| DE | 103 12 822 A1 | 9/2004 |

(Continued)

OTHER PUBLICATIONS

International Search Report corresponding to PCT Application No. PCT/EP2016/061451, dated Sep. 29, 2016 (German and English language document) (8 pages).

*Primary Examiner* — Imran K Mustafa
(74) *Attorney, Agent, or Firm* — Maginot, Moore & Beck LLP (57) ABSTRACT

A method for providing a brake force in a vehicle with a hydraulic vehicle brake and an electromechanical brake device includes determining a position of a brake piston at a brake contact point on the basis of a state variable of an electric brake motor when the electromechanical brake device is released. The method further includes displacing the brake piston in a positioning operation until reaching a braking start point.

12 Claims, 5 Drawing Sheets

(51) Int. Cl.
*B60T 13/58* (2006.01)
*B60T 7/10* (2006.01)
*B60T 13/14* (2006.01)

(52) U.S. Cl.
CPC .......... *B60T 13/588* (2013.01); *B60T 13/741* (2013.01); *B60T 2201/06* (2013.01); *B60T 2201/10* (2013.01)

(56) References Cited

U.S. PATENT DOCUMENTS

| | | | |
|---|---|---|---|
| 2014/0076674 A1* | 3/2014 | Baehrle-Miller | B60T 13/588 188/159 |
| 2014/0202801 A1* | 7/2014 | Berger | B60T 13/588 188/106 P |

FOREIGN PATENT DOCUMENTS

| | | |
|---|---|---|
| DE | 10 2011 078 900 A1 | 1/2013 |
| DE | 10 2012 205 576 A1 | 10/2013 |
| FR | 2 911 839 A1 | 8/2008 |
| JP | 2000-46082 A | 2/2000 |
| JP | 2000-055093 A | 2/2000 |
| JP | 2001-225741 A | 8/2001 |
| JP | 2001-341626 A | 12/2001 |
| JP | 2003-194119 A | 7/2003 |
| JP | 2008-57642 A | 3/2008 |
| JP | 2008-133922 A | 6/2008 |
| JP | 2010-241389 A | 10/2010 |
| JP | 2014-500184 A | 1/2014 |

\* cited by examiner

METHOD FOR PROVIDING A BRAKE FORCE IN A VEHICLE

This application is a 35 U.S.C. § 371 National Stage Application of PCT/EP2016/061451, filed on May 20, 2016, which claims the benefit of priority to Serial No. DE 10 2015 209 480.4, filed on May 22, 2015 in Germany, Serial No. DE 10 2016 205 985.8, filed on Apr. 11, 2016 in Germany, and Serial No. DE 10 2016 208 605.7, filed on May 19, 2016 in Germany, the disclosures of which are incorporated herein by reference in their entirety.--

BACKGROUND

The disclosure relates to a method for providing a braking force in a vehicle.

From DE 10 2011 078 900 A1, an electromechanical parking brake is known with an electric brake motor that is integrated within the wheel brake device of a hydraulic vehicle brake of the vehicle. Using the electromechanical parking brake, when at a standstill the vehicle can be prevented from rolling away. In order to produce a braking force, the electric brake motor is actuated and the rotational movement is transferred into an axial control movement of a spindle nut, by means of which a brake piston, which is a carrier of a brake lining, is pressed axially against a brake disk.

The hydraulic fluid of the hydraulic vehicle brake also acts on the brake piston in order to produce a braking force during normal brake operation while the vehicle is travelling.

SUMMARY

The disclosure concerns a method for positioning the spindle nut on an automated parking brake from the closed state. Using the method according to the disclosure, a braking force can be provided in a vehicle that is provided with a hydraulic vehicle brake and with an electromechanical brake device, wherein the electromechanical brake device comprises an electric brake motor that acts on the same brake piston as the hydraulic vehicle brake. The brake piston carries a brake lining that is pressed against a brake disk during braking. During actuation of the electromechanical brake device, the rotational movement of the rotor of the electric brake motor is advantageously transferred into an axial actuation movement of a spindle nut that presses against the brake piston.

The hydraulic vehicle brake comprises one or a plurality of wheel brake devices on one or more wheels of the vehicle, in which brake fluid under hydraulic pressure acts upon the same brake piston, which is also displaced by the electric brake motor of the electromechanical brake device. The brake piston can alternatively be actuated either by the hydraulic vehicle brake or by the electromechanical brake device. A combination is also possible, so that the brake piston can be acted upon or displaced both by the electric brake motor and also by the brake fluid of the hydraulic vehicle brake.

With the method for providing a braking force, during releasing of the electromechanical brake device—during the transition from the clamped state with electromechanical braking force to the released state without electromechanical braking force—the position of the brake piston at the brake contact point is determined from an electric motor state variable of the electric brake motor. The brake contact point is that position of the brake piston at which the brake piston or the brake lining acted upon by the brake piston contacts the brake disk without an air gap. The brake contact point of the brake piston is stored, so that the position of the brake contact point is available at a later point in time.

Then in the event of an anticipated subsequent braking process, during a positioning process still prior to the generation of a braking force the brake piston is moved up to a braking start point that lies between a starting position of the brake piston with no braking torque or braking force and the brake contact point. The braking start point is at a distance from the brake contact point, so that no electric motor braking force is yet produced at the braking start point and there is sufficient distance between the brake lining and the brake disk to exclude an unintentional contact and hence brake drag with sufficient certainty. At the same time however, the remaining free travel between the braking start point and the brake contact point is reduced, so that in the event of demanding an electromechanically provided braking force, the brake piston overcomes the remaining free travel in the shortest possible time and the build-up of the electromechanical braking force can take place. In total, in this way the period of time that is required for the build-up of an electromechanical braking force is reduced.

The brake piston is initially moved up to the braking start point in a positioning process before the generation of an electromechanical braking force and stays at said point until there is a demand to produce an electromechanical braking force. Thereupon, the electric brake motor is actuated again and the brake piston is moved from the braking start point towards the brake contact point to produce the electromechanical braking force.

Various braking situations are possible, in which the method according to the disclosure for providing the braking force can be carried out. According to an advantageous embodiment, the brake contact point is directly approached from the brake position of the brake piston of a preceding braking process. In said procedure, the brake piston is not moved up to the starting position that is free of braking torque, but is moved directly from the brake position to the brake contact point. Said procedure has the advantage that the releasing process can be carried out in a shorter time. Then the brake piston is at the braking start point and in the event of a demand for an electromechanical braking force can be moved in the shortest possible time towards the brake contact point, from which the braking force is built up when clamping electromechanically.

It also advantageous that the starting position of the brake piston can be selected closer to the brake contact point, so that shorter distances can be traversed to reach the starting position and to reach the braking start point when starting from the starting position. In addition, the distances traveled by the brake piston are reduced in the case of a normal electromechanical braking process.

According to a further advantageous embodiment, the braking start point of the brake piston is approached from the starting position that is free of braking torque. With said embodiment, the brake contact point is initially determined from the electric motor state variable of the brake motor during a releasing process of the electromechanical brake device.

Then the brake piston is moved until reaching the starting position that is free of braking torque. It is only at a subsequent point in time in the positioning process that the brake piston is initially moved to the braking start point, starting from which the brake piston can be moved towards the brake contact point at any time for the build-up of an electromechanical braking force.

Said procedure is for example carried out in cases in which the braking process is preferably performed by means of the hydraulic vehicle brake and only additionally by means of the electromechanical device. For example, such a procedure can be advantageous for carrying out an automatic parking process or a process of exiting a parking space without any activity by the driver. However, the electromechanical brake device can also be actuated in other driving situations to increase reliability, for example when driving at higher speed.

In any case—both in the case of a direct approach to the braking start point from the brake contact point and also when approaching the braking start point from the starting position—in the case of an extended manner of operation the braking process is primarily carried out by means of the hydraulic vehicle brake, and the electromechanical brake device is only actuated in the case in which the required braking force cannot be provided or cannot be fully provided by means of the hydraulic vehicle brake, for example in the event of a failure of the hydraulic vehicle brake. As the brake piston is already at the braking start point thereof in this case, only a short amount of free travel has to be overcome until reaching the brake contact point, so that the build-up of the electromechanical braking force can be started in a reduced time.

According to an advantageous embodiment, the electric motor state variable, using which the brake contact point is determined, is the motor current of the electric brake motor. Said current rises during the build-up of electromechanical braking force and moves to a constant idling level during idling of the brake motor if no electromechanical braking force is applied. The transition from the constant idling level to the rising braking force build-up level in the form of a point of inflection constitutes the brake contact point.

In an alternative and additional embodiment, the electric motor state variable that is used for the determination of the brake contact point is the motor speed of the electric brake motor. The motor speed is reduced relative to the idling speed during the build-up of braking force. There is also a point of inflection in the motor speed in the transition from the idling speed to the speed at the start of braking force build-up, which constitutes the brake contact point.

According to yet another advantageous embodiment, during the determination of the braking start point during the releasing process, the electromechanical brake device can take into account the hydraulic bias pressure in the hydraulic vehicle brake, which can be measured. The hydraulic bias pressure results in an elastic deformation of the brake caliper, in particular in the linear-elastic region, whereby there is an influence on the braking start point. Without a hydraulic bias pressure, the braking start point is determined directly from the brake contact point, for example by assuming a constant offset from the brake contact point. On applying a hydraulic bias pressure, the resulting elastic displacement of the brake caliper must be taken into account, wherein with increasing bias pressure the distance covered during the positioning process between the starting position of the brake piston that is free of braking torque and the braking start point is subtracted. The bias pressure distance, which refers to the elastic deformation of the brake caliper owing to the applied hydraulic bias pressure, is accordingly subtracted from the distance covered by the brake piston to reach the braking start point.

According to yet another advantageous embodiment, during the determination of the braking start point an additional tolerance value is taken into account, which takes into account tolerances during the determination of the bias pressure.

The various steps of the method proceed automatically and are in particular carried out in a regulating unit or a control unit. Said control unit can be a component of the vehicle's brake system or can communicate with the regulating unit or control unit of the vehicle's brake system.

BRIEF DESCRIPTION OF THE DRAWINGS

Further advantages and advantageous embodiments can be found in the further claims, the description of the figures and the drawings. In the figures:

DETAILED DESCRIPTION

In the figures, identical components are provided with the same reference characters.

Figure 1:
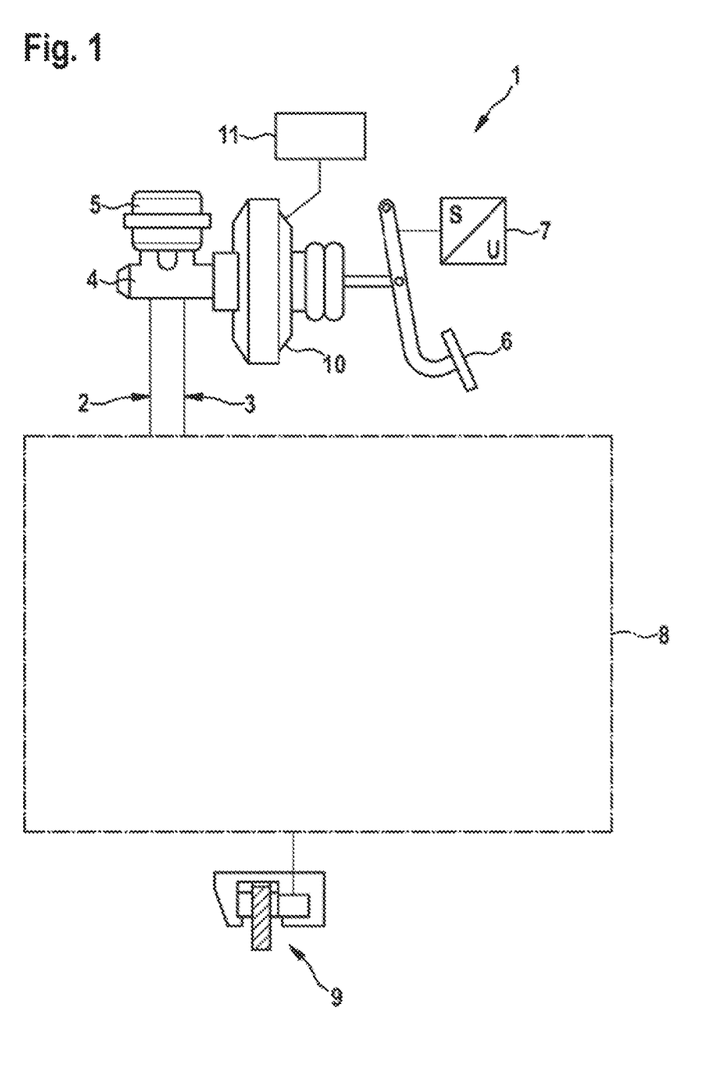
FIG. 1 shows a schematic representation of a hydraulic vehicle brake with a brake force booster, wherein the wheel brake devices of the vehicle brake on the vehicle's rear axle are additionally implemented as an electromechanical brake device with an electric brake motor.

The hydraulic vehicle brake 1 for a vehicle represented in FIG. 1 comprises a front axle brake circuit 2 and a rear axle brake circuit 3 for supplying and actuating wheel brake devices 9 on each wheel of the vehicle with a brake fluid under hydraulic pressure. The two brake circuits 2, 3 are connected to a common master brake cylinder 4 that is supplied with brake fluid via a brake fluid reservoir container 5. The master brake cylinder piston within the master brake cylinder 4 is actuated by the driver by means of the brake pedal 6 and the pedal travel exerted by the driver is measured by means of a pedal travel sensor 7. Between the brake pedal 6 and the master brake cylinder 4 there is a brake force booster 10, which for example comprises an electric motor that preferably actuates the master brake cylinder 4 by means of a gearbox (iBooster).

The control movement of the brake pedal 6 measured by the pedal travel sensor 7 is transmitted as a sensor signal to a regulating unit or control unit 11, in which control signals for actuating the brake force booster 10 are generated. Supplying the wheel brake devices 9 with brake fluid is carried out in each brake circuit 2, 3 by means of different switching valves, which in common with further assemblies are part of the brake hydraulics 8. Furthermore, the brake hydraulics 8 include a hydraulic pump that is a component of an electronic stability program (ESP).

Figure 2:
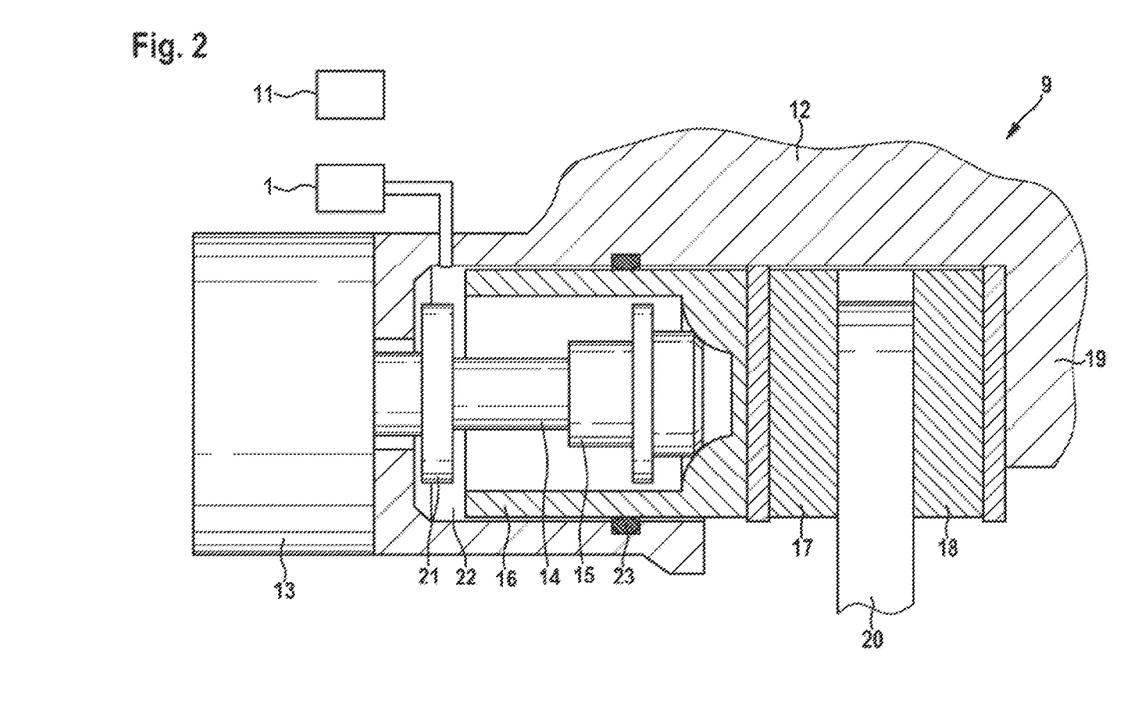
FIG. 2 shows a section through an electromechanical brake device with an electric brake motor.

In FIG. 2, the wheel brake device 9 that is disposed on a wheel on the rear axle of the vehicle is represented in detail. The wheel brake device 9 is part of the hydraulic vehicle brake 1 and is supplied with brake fluid 22 from the rear axle brake circuit. Moreover, the wheel brake device 9 comprises an electromechanical brake device that is preferably used as a parking brake for holding a vehicle at a standstill, but also to slow down the vehicle while the vehicle is moving, in particular at lower vehicle speeds below a speed limit value.

The electromechanical brake device comprises a brake caliper 12 with a claw 19 that engages over a brake disk 20. The brake device comprises a d.c. electric motor as a brake motor 13 forming the actuator, the rotor shaft of which drives a spindle 14 in rotation, on which a spindle nut 15 is rotationally fixedly supported. During rotation of the spindle 14, the spindle nut 15 is displaced axially. The spindle nut 15 moves within a brake piston 16 that is the carrier for a brake lining 17, which is pressed against the brake disk 20 by the brake piston 16. On the opposite side of the brake disk 20 there is another brake lining 18 that is held in a fixed position on the claw 19. The brake piston 16 is sealed pressure tight relative to the accommodating housing on the outside thereof by means of an encircling sealing ring 23.

Within the brake piston 16, the spindle nut 15 can move axially forwards towards the brake disk 20 during a rotary motion of the spindle 14 or axially rearwards during an opposite rotary motion of the spindle 14 until reaching a stop 21. For producing a clamping force, the spindle nut 15 acts upon the inner end face of the brake piston 16, whereby the brake piston 16 that is axially movably mounted in the brake device is pressed against the facing end face of the brake disk 20 with the brake lining 17.

For the hydraulic braking force, the hydraulic pressure of the brake fluid 22 from the hydraulic vehicle brake 1 acts on the brake piston 16. The hydraulic pressure can also act supportively when the vehicle is at a standstill on actuation of the electromechanical brake device, so that the total braking force is made up of the electric motor-actuated component and the hydraulic component. While the vehicle is travelling, either only the hydraulic vehicle brake is active or both the hydraulic vehicle brake and also the electromechanical brake device are active, or only the electromechanical brake device is active to produce braking force. The control signals for actuating both the adjustable components of the hydraulic vehicle brake 1 and also the electromechanical wheel brake device 9 are produced in the regulating unit or control unit 11.

Figure 3:
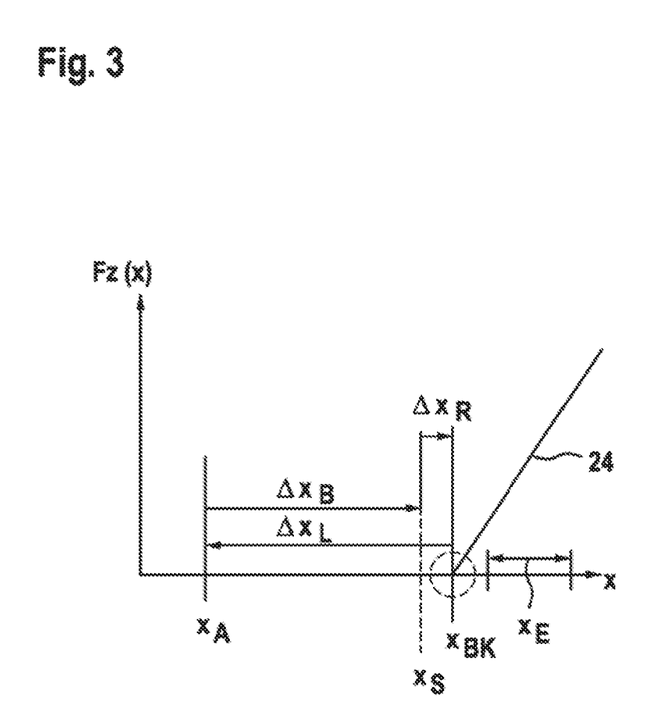
FIG. 3 shows a diagram with the distance-dependent profile of the electromechanical braking force.

FIG. 3 shows a diagram with the distance-dependent profile of the electromechanical braking force, which is produced on actuation of the electric brake motor of the electromechanical brake device. The electromechanical braking force 24 produced on actuation of the electric brake motor during a braking process, starting from a starting position $x_A$, initially lies at the value 0 and rises linearly on reaching a brake contact point $x_{BK}$. The starting position $x_A$ of the brake piston of the electric brake motor characterizes an initial state that is free of braking torque. The distance covered between the starting position $x_A$ and the brake contact point $x_{BK}$, at which the brake piston or the brake lining on the brake piston is in contact with brake disk, is referred to as free travel $\Delta x_L$.

With the application of electromechanical braking force during a braking or clamping process, the brake piston reaches an end position $x_E$ that is located after the brake contact point $x_{BK}$ and the exact position of which depends on the level of the electromechanical braking force to be applied.

Using the method according to the disclosure, during a positioning process a braking start point $x_S$ can be determined that lies between the starting position $x_A$ that is free of braking torque and the brake contact point $x_{BK}$. The braking start point $x_S$ is still within the free travel $\Delta x_L$, but at a short distance from the brake contact point $x_{BK}$. If the brake piston takes up the position at the braking start point $x_S$, then the remaining free travel $\Delta x_R$ until reaching the brake contact point $x_{BK}$ and the subsequent build-up of force can be traversed in the shortest possible time. At the same time, it is guaranteed that there is a sufficiently large air gap between the brake linings and the brake disk to reliably preclude inadvertent, unwanted dragging of the brake linings on the brake disk within the occurring temperature range.

The determination of the braking start point $x_S$ is carried out starting from the end position $x_E$ of the brake piston, which can adopt a different position with the electromechanical brake device in the clamped state depending on the level of the currently acting electromechanical braking force.

If the clamped electromechanical brake device is released by actuating the electric brake motor, so that the brake piston moves towards the starting position $x_A$, then the electromechanical braking force 24 decreases until reaching the brake contact point $x_{BK}$ and then remains at the zero level during the further travel.

The transition of the electromechanical braking force 24 from the rising or falling branch to the zero level at the brake contact point $x_{BK}$ can be determined using the inflected profile of an electric motor state variable of the electric brake motor, in particular using the motor current, possibly also using the motor speed.

If the electromechanical brake device is fully released, then the brake piston moves to the starting position $x_A$ thereof, in which no braking torque is applied. The distance covered by the brake piston between the brake contact point $x_{BK}$ and the starting position $x_A$ is referred to as the free travel $\Delta x_L$.

Conversely, starting from the starting position $x_A$ of the brake piston, the closure travel $\Delta x_B$ of the brake piston is traversed until reaching the braking start point $x_S$ during a braking process or an imminent braking process. The remaining free travel between the braking start point $x_S$ and the brake contact point $x_{BK}$, from which the build-up of the electromechanical braking force is carried out, is referred to as $\Delta x_R$.

Figure 4:
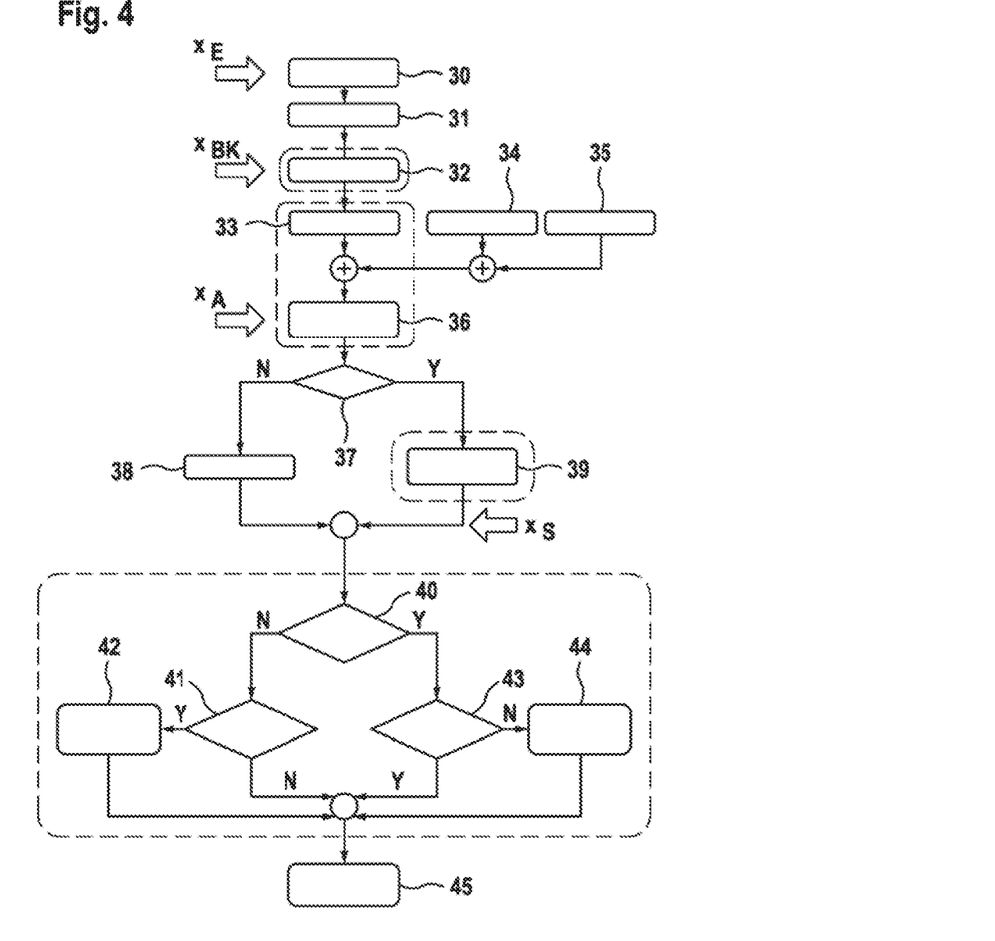
FIG. 4 shows a flow chart with steps of the method for providing a braking force in a vehicle.

In FIG. 4, a first flow chart is shown with steps of the method with which electromechanical braking force can be provided in a vehicle. The method starts in the first step 30 from the clamped brake state of the electromechanical brake device, in which the brake piston adopts the end position $x_E$ thereof. In the step 30, the clamped brake device starts to be released, which is carried out in the next step 31 of the method to decrease the electromechanical braking force. The brake piston is displaced by actuating the electric brake motor towards the starting position thereof that is free of braking torque.

In the step 32 the detection of the brake contact point $x_{BK}$ is carried out using the inflection in the profile of the electromechanically produced braking force, which can be detected in particular using the motor current profile of the electric brake motor, possibly also using the profile of the motor speed of the electric motor.

The next steps of the method 33 through 36 concern the displacement movement of the piston from the brake contact point $x_{BK}$ to the starting position $x_A$ that is free of braking torque. During step 33, the distance that the brake piston travels is detected. The step 34 concerns the linear-elastic deformation of the brake caliper caused by a hydraulic bias pressure that is acting on the brake piston and that can be attributed to the actuation of the hydraulic vehicle brake. With knowledge of the hydraulic bias pressure, which is determined by a sensor, the stiffness of the brake caliper and the brake piston area, the bias pressure distance can be determined, which is attributed to the linear-elastic deformation due to the hydraulic bias pressure. Said bias pressure distance adds to the free travel that must be traversed by the brake piston during the releasing process in order to reach the starting position.

In addition, in the step 35 of the method tolerances in the increase in the force, in the hydraulic bias pressure and in the travel calculation are taken into account. Said tolerances are also added to the free travel that must be traversed by the piston in order to reach the starting position (step 36).

In the next step 37, a query is carried out as to whether the brake piston is initially to be moved to the braking start point $x_S$ in a positioning process. Said query is carried out depending on the situation.

In particular, regarding an automated parking process or a parking space exiting process, but possibly also during normal travel at higher speeds, recourse is preferably made to the hydraulic vehicle brake for slowing down the vehicle and additionally, in particular in the event of a fault in the hydraulic vehicle brake, to the electromechanical brake device.

In order to guarantee that in the event of a demand for electromechanical braking force the same can be provided within a short time, the brake piston of the electric brake motor is moved to the braking start point $x_S$ thereof. Said query is carried out in the step 37. If the result of the query is that positioning of the brake piston at the braking start point is desired, the yes branch ("Y") is then advanced to the next step 39, in which the brake piston is actuated and moved from the starting position $x_A$ to the braking start point $x_S$. The brake piston remains in said position until a specific braking force demand is made to the electromechanical brake device.

If the result of the query in the step 37 is that positioning of the brake piston at the braking start point $x_S$ is not desired, the no branch ("N") is then advanced to the step 38, according to which the brake piston is displaced for carrying out a braking process, but without remaining at the braking start point $x_S$. The brake piston is actuated until the desired electromechanical braking force is achieved.

The following steps 40 through 44 concern the build-up of braking force by means of the electromechanical brake device. Initially, in the step 40 the query is carried out as to whether an electromechanical braking force has already built up. If this is not the case, the no branch is then advanced to step 41, in which the query is carried out as to whether a braking force build-up is desired. If this is the case, following the yes branch in the step 42 the electric brake motor is consequently actuated towards the closing or clamping position and an electromechanical braking force is built up. If this is not the case, the no branch is then advanced to the step 45, in which the method is terminated.

If by contrast the result of the query in the step 40 is that a clamping force has already built up, the yes branch is then advanced to the step 43 and a query is carried out as to whether the braking force is to be maintained. If so, the yes branch is then advanced to the step 45 without further actuation of the electric brake motor to the end of the method. If by contrast the result of the query in the step 43 is that the achieved braking force is not to be maintained, the no branch is then advanced to the step 44 and the electric brake motor is actuated towards the open or release position, so that braking force is reduced. It is then advanced to the step 45 and the method is terminated.

With the method according to FIG. 4, the braking start point $x_S$ is determined from the brake contact point $x_{BK}$. The brake piston then moves back to the starting position $x_A$ thereof, and only in the event of a subsequent, later braking process is it moved to the braking start point $x_S$, from which electromechanical braking force is built up once there is a suitable demand.

Figure 5:
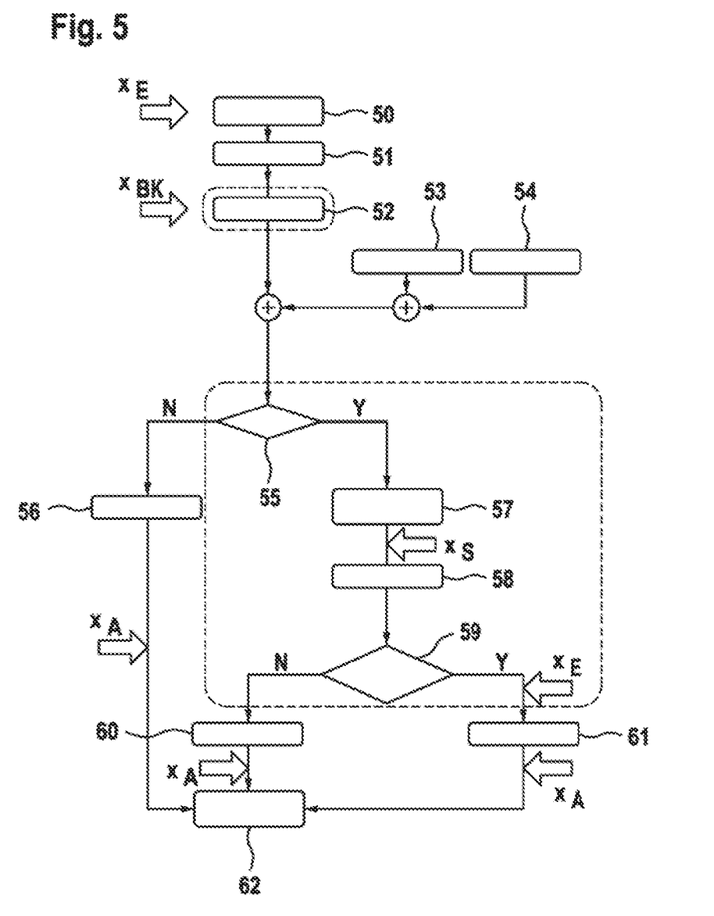
FIG. 5 shows a flow chart with steps of the method for providing a braking force in a vehicle in a variant of the embodiment.

In the next method according to FIG. 5, by contrast the brake piston is moved in the positioning process directly from the end position $x_E$ thereof to the braking start point $x_S$, in which the brake piston remains until there is a demand for a braking process.

Initially according to FIG. 5, the start of the releasing process from the braked state, in which the brake piston is in the end position $x_E$, is carried out in the step 50. With the actuation of the electric brake motor towards the released or open position, the braking force is reduced in the step 51. In the step 52, the released piston has reached the brake contact point $x_{BK}$, which is determined using the profile of the motor current or the motor speed.

In the steps 53 and 54, corresponding to the steps 34 and 35 in FIG. 4, a bias pressure-dependent additional travel and an additional travel that is attributable to the tolerances are detected. Said travel components are added to the position of the determined brake contact point $x_{BK}$ in order to obtain the position of the braking start point $x_S$.

In the next step 55, a query is carried out as to whether adopting the braking start point $x_S$ is to be carried out. If this is not the case, the no branch is then advanced to the step 56, according to which the starting position $x_A$ of the brake piston that is free of braking torque is adopted. In this case the method is terminated in the next step 62.

If by contrast the result of the query in the step 55 is that stopping at the braking start point $x_S$ is desired, the yes branch is then advanced to the step 57, in which the electric brake motor is actuated in such a way that the brake piston remains at the braking start point $x_S$. Said position is finally reached in the step 58.

In the step 59, the query is carried out as to whether braking force is to be provided by means of the electromechanical brake device without delay. This is only the case if the hydraulic vehicle brake, by means of which braking takes place during the represented maneuver, fails or at least cannot provide the necessary deceleration. In this case, the electromechanical brake device is actuated to provide the desired braking force additionally or instead of the hydraulic vehicle brake. The entire driving maneuver to which the method shown relates is an automated parking process or a process of exiting a parking space that is carried out without operation by the driver.

If the result of the query in the step 59 is that no electromechanical braking force is necessary, which is the case with a properly operating hydraulic vehicle brake, the no branch is then advanced to the next step 60, according to which the brake piston is moved by actuating the electric brake motor until reaching the starting position $x_A$. The end of the method is then reached in the step 62.

If the result of the query in the step 59 is that an electromechanical braking force is to be generated, following the yes branch the electric brake motor is initially actuated to clamp the brake piston until the desired braking force is produced on reaching the piston end position $x_E$. Once there is a suitable driver demand, in the step 61 the electric brake motor is actuated to release the electromechanical brake device until the starting position $x_A$ that is free of braking torque is reached. The method is then terminated according to step 62.

The invention claimed is:
1. A method for providing a braking force in a vehicle that includes a hydraulic vehicle brake and an electromechanical brake device, the electromechanical brake device including an electric brake motor configured to displace a brake piston against a brake disk, the method comprising:

determining a position of the brake piston at a brake contact point in which the brake piston is in contact with the brake disk with no air gap, the position of the brake piston determined from an electric motor state variable of the electric brake motor during the releasing of the electromechanical brake device; and moving the brake piston to a braking start point in a positioning process carried out before the generation of braking force, the braking start point lying between a starting position of the brake piston that is free of braking torque and the brake contact point, but at a distance from the brake contact point.

2. The method as claimed in claim 1, wherein the brake piston remains at the braking start point until an electromechanical braking demand is carried out.

3. The method as claimed in claim 1, wherein the electric motor state variable is the motor current of the electric brake motor.

4. The method as claimed in claim 1, wherein the electric motor state variable is the motor speed of the electric brake motor.

5. The method as claimed in claim 1, wherein the braking start point is approached directly from the brake position of a preceding braking process.

6. The method as claimed in claim 1, wherein braking start point is approached from the starting position of the brake piston that is free of braking torque.

7. The method as claimed in claim 1, wherein during the determination of the braking start point during the releasing of the electromechanical brake device, the hydraulic bias pressure in the hydraulic vehicle brake is taken into account, and wherein the distance traversed during the subsequent braking process between the starting position of the brake piston that is free of braking torque and the braking start point decreases with increasing bias pressure.

8. The method as claimed in claim 1, wherein a tolerance value is additionally taken into account during the determination of the braking start point.

9. The method as claimed in claim 1, further comprising carrying out an automatic parking process or a process of exiting a parking space.

10. The method as claimed in claim 1, wherein the braking process is carried out by the hydraulic vehicle brake and by the electromechanical brake device.

11. A regulating unit or a control unit for carrying out a method for providing a braking force in a vehicle, the vehicle including a hydraulic vehicle brake and an electromechanical brake device, the electromechanical brake device including an electric brake motor configured to displace a brake piston against a brake disk, the regulating unit or the control unit configured to:

determine a position of the brake piston at a brake contact point in which the brake piston is in contact with the brake disk with no air gap, the position of the brake piston determined from an electric motor state variable of the electric brake motor during the releasing of the electromechanical brake device, and move the brake piston to a braking start point in a positioning process carried out before the generation of braking force, the braking start point lying between a starting position of the brake piston that is free of braking torque and the brake contact point, but at a distance from the brake contact point.

12. A parking brake in a vehicle, comprising:

an electromechanical brake device including an electric brake motor configured to displace a brake piston towards a brake disk; and a regulating unit configured to actuate adjustable components of the parking brake in order to provide a braking force in the vehicle, the regulating unit further configured to (i) determine a position of the brake piston at a brake contact point in which the brake piston is in contact with the brake disk with no air gap, the position of the brake piston determined from an electric motor state variable of the electric brake motor during the releasing of the electromechanical brake device, and (ii) move the brake piston to a braking start point in a positioning process carried out before the generation of braking force, the braking start point lying between a starting position of the brake piston that is free of braking torque and the brake contact point, but at a distance from the brake contact point.

* * * * *

UNITED STATES PATENT AND TRADEMARK OFFICE
CERTIFICATE OF CORRECTION

PATENT NO. : 11,148,652 B2  
APPLICATION NO. : 15/558292  
DATED : October 19, 2021  
INVENTOR(S) : Baehrle-Miller et al.

Page 1 of 1

It is certified that error appears in the above-identified patent and that said Letters Patent is hereby corrected as shown below:

On the Title Page

Item (30), in Line 3: "May 9, 2016" should read --May 19, 2016--.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*